Figure 1:
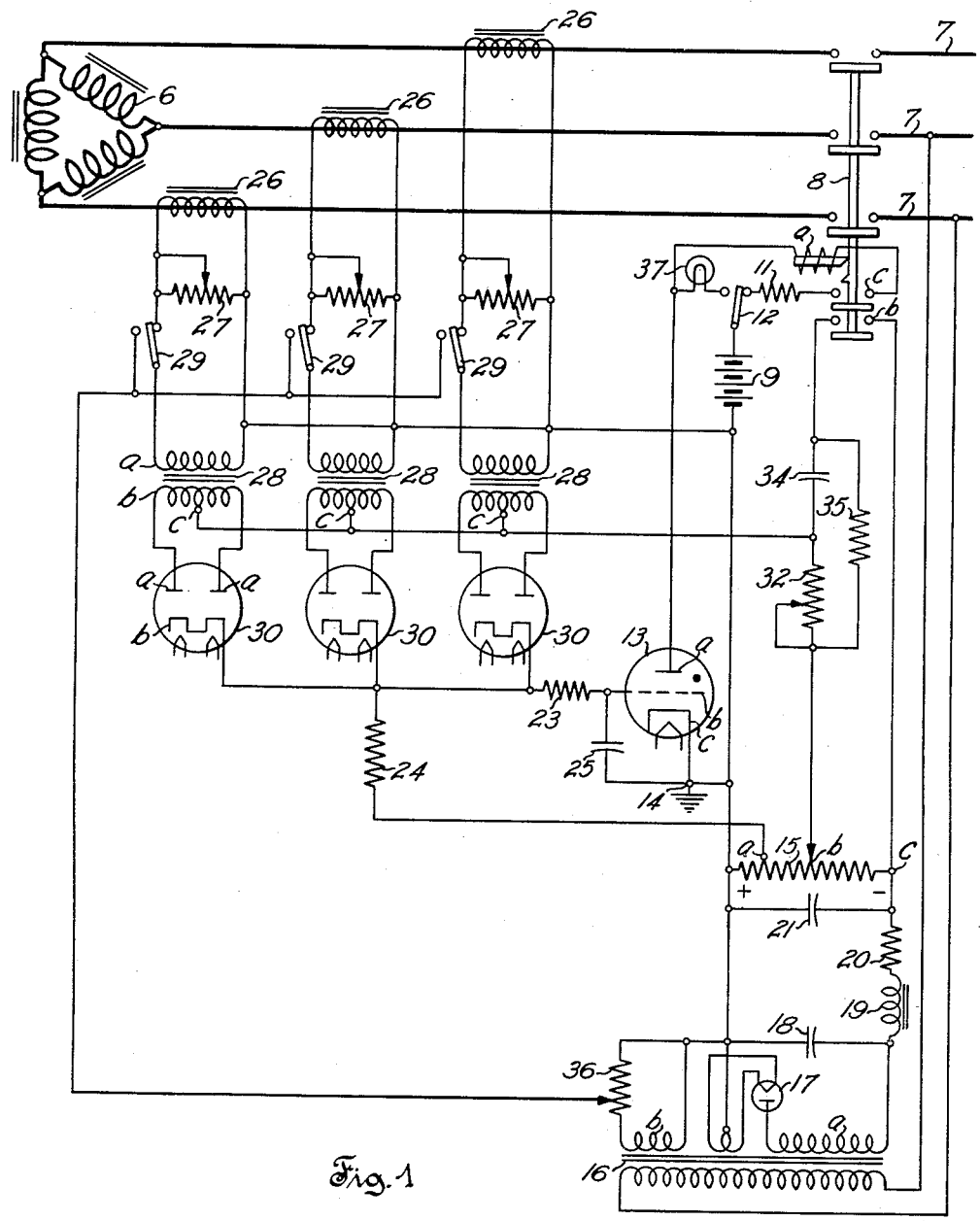

Patented May 1, 1951

UNITED STATES PATENT OFFICE 2,551,022

2,551,022

ELECTRIC PROTECTIVE SYSTEM WITH INRUSH CURRENT COMPENSATION

Karl Lerstrup, Milwaukee, Wis., assignor to Allis-Chalmers Manufacturing Company, Milwaukee, Wis., a corporation of Delaware Application November 30, 1945, Serial No. 632,087

13 Claims. (Cl. 175—294)

This invention relates in general to improvements in electric protective systems and more particularly to means for controlling the operation of a switch connecting an inductive device with a source of alternating current.

When a transformer or other inductive device having a ferromagnetic core is connected to a source of alternating current through a switch, automatic opening of the switch is frequently effected in response to some abnormal operating condition of the device such as overload, unbalance between current in different windings, etc. After the transformer has been disconnected from the source the core thereof remains magnetized to a variable degree, with the result that when the transformer is again connected to the source the magnetization of the transformer core may momentarily reach the saturation range. Upon closure of the switch, the transformer exciting current may therefore initially reach a value in excess of the normal rating of the transformer and thereafter decrease exponentially to its normal value. This transient exciting current, generally designated as inrush current, may cause undesired operation of the protective system associated with the switch unless the sensitivity of the protective system is so low as to render the system of doubtful usefulness.

The above mentioned disadvantage may be obviated by causing the sensitivity of the protective system to be low at the moment of closure of the switch and by gradually increasing the sensitivity to its normal value upon closure of the switch. In preferred embodiments of the invention, energization of the switch trip coil is controlled by an electric valve responsive to the flow of current through the transformer, and at the moment of closure of the switch a transient voltage having an exponential rate of change is impressed on a circuit controlling the conductivity of the valve to render the valve unresponsive to the flow of inrush current through the transformer. To accelerate the operation of the switch, energy for the trip coil may be advantageously supplied from a charged capacitor, and the control element of the valve may likewise be energized from a second capacitor through a second electric valve.

It is therefore an object of the present invention to provide an improved system for rendering a current responsive system unresponsive to the flow of inrush current through an inductive device.

Another object of the present invention is to provide an improved system for protecting an inductive device against abnormal operating conditions to substantially the same extent during normal operation of the device and during flow of inrush current therethrough.

Another object of the present invention is to provide a current responsive system in which the sensitivity may be varied gradually from a predetermined value to another predetermined value in a predetermined length of time.

Another object of the present invention is to provide an improved electric protective system in which high intensity current impulses may be supplied to the trip coil of a switch without using a switching device for interrupting the trip coil current.

Figure 2:
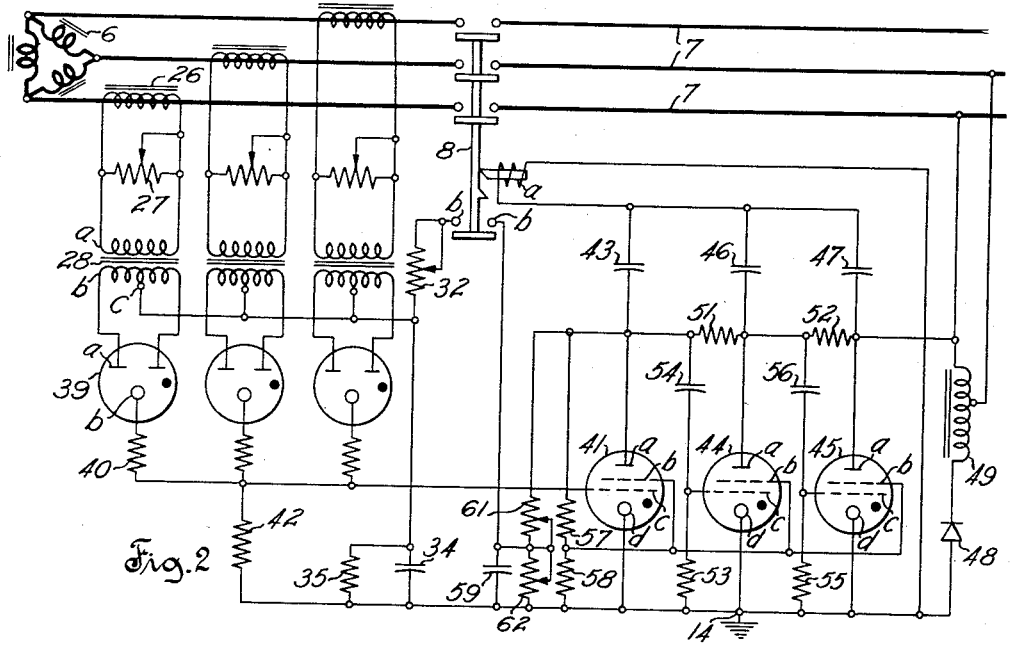
Figure 3:
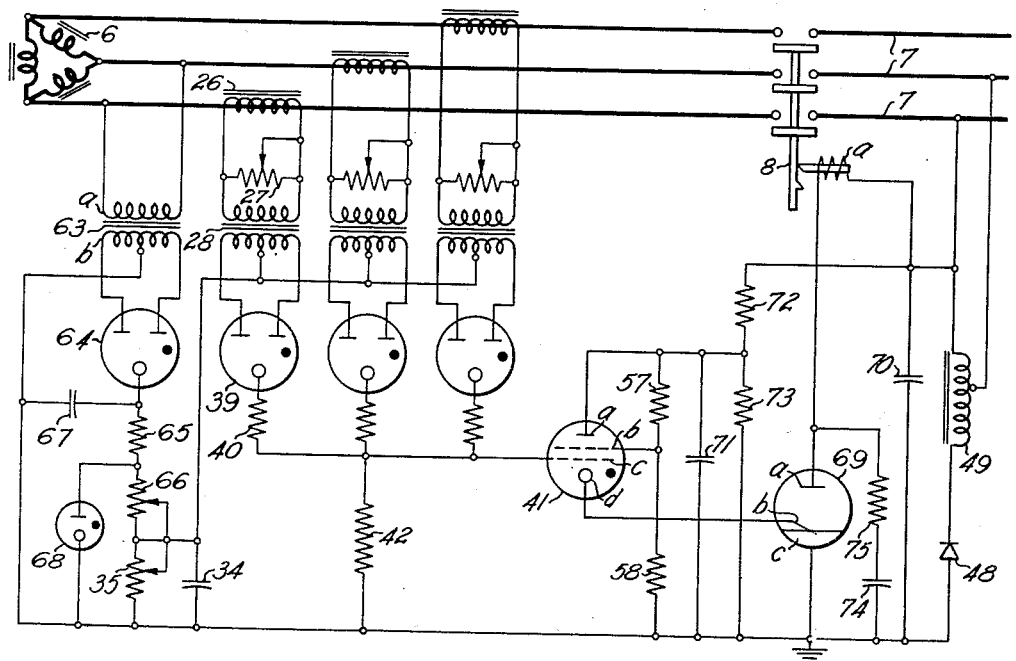

Objects and advantages other than those above set forth will be apparent from the following description when read in connection with the accompanying drawing, in which:

Fig. 1 diagrammatically illustrates one embodiment of the present invention in which the current responsive element is an electric valve of the thyratron type;

Fig. 2 diagrammatically illustrates another embodiment of the present invention in which electric valves of the glow discharge type serve as current responsive elements and control the operation of a tube of the glow or arc discharge type; and Fig. 3 diagrammatically illustrates another embodiment of the present invention in which electric valves of the glow discharge type serve as current responsive elements and control the operation of another electric valve of the ignitron type.

Referring more particularly to Fig. 1 of the drawing by characters of reference, numeral 6 designates an inductive winding forming part of an inductive device such as a transformer or reactor provided with a magnetizable core. Winding 6 is to be energized from a source of alternating current represented as a polyphase circuit 7 supplied from a suitable generator (not shown). The connections between winding 6 and circuit 7 are controlled by means of a switch 8 operable into the open position in response to energization of trip coil 8a thereof. A suitable source of current such as a battery 9 may be operatively connected with trip coil 8a through a test switch 12, a current limiting resistor 11, contacts 8c, trip coil 8a, and an electric valve 13 of the thyratron type. The framework supporting the elements of the system and cathode 13c of the thyratron are preferably grounded as indicated at 14.

The conductivity of thyratron 13 may be controlled by impression of different control voltages on a control circuit connecting grid 13b to cathode 13c. The control circuit comprises a voltage divider 15 which is connected with cathode 13c and is impressed with unidirectional voltage from a suitable source of direct current. Current for the voltage divider may be conveniently obtained from circuit 7 through a rectifying system comprising a transformer 16 and a rectifying tube 17. The output current of tube 17 is preferably filtered by means of a shunt capacitor 18, a series reactor 19 associated with a current limiting resistor 20, and a second shunt capacitor 21. Grid 13b is permanently connected with a tap 15a of voltage divider 15 through current limiting resistors 23, 24 to receive from the voltage divider a negative bias potential of sufficiently high value to maintain thyratron 13 nonconductve. Grid 13b is also connected with cathode 13c through a capacitor 25 for diverting accidental surge potentials which might cause undesired operation of the thyratron.

Positive energization of grid 13b to cause disconnecting operation of switch 8 may be effected by means of a combination of elements responsive to any desired operating conditions of winding 6, and the system illustrated in Fig. 1 is assumed to be responsive to the flow of overload current through the winding. For the latter purpose a plurality of current transformers 26 are severally inserted in the different connections between winding 6 and circuit 7 or in the different conductors of circuit 7. Transformers 26 supply current to adjustable resistors 27, and the voltage drops in the resistors are impressed on the primary windings 28a of a plurality of transformers 28 through a corresponding number of test switches 29. The secondary windings 28b of transformers 28 are connected with a rectifying device of any suitable type for impressing on the grid control circuit a unidirectional voltage which is proportional to the magnitude of the current flow through winding 6. The rectifying device may consist of a plurality of double diodes 30 having their anodes 30a connected to the terminals of windings 28b. The cathodes 30b of diodes 30 are jointly connected to the point of juncture of resistor 23 and resistor 24. Windings 28b are provided with midtaps 28c jointly connected to an adjustable tap 15b of voltage divider 15 through an adjustable resistor 32.

To render the system unresponsive to the flow of inrush current through winding 6, taps 28c may be connected with the negative terminal 15c of voltage divider 15 through a capacitor 34 and through contacts 8b of switch 8 to thereby impress on the control circuit of grid 13b a transient unidirectional voltage having a predetermined initial value and an exponential rate of decay. A discharge resistor 35 is connected across capacitor 34 and resistor 32 to discharge the capacitor when switch 8 is opened. A test voltage may be impressed on windings 28a through switches 29 from a voltage divider 36 energized from a suitable winding 16b of transformer 16. The voltage of battery 9 may be impressed on thyratron 13 through switch 12 and through a suitable current indicator such as an incandescent lamp 37 without thereby energizing trip coil 8a.

The electrical characteristics of some of the elements of the system will be determined by the rating of winding 6, and the remaining elements of the system may be chosen arbitrarily subject to final adjustment after the system is assembled. It has been found that satisfactory operation of the system may be obtained when the essential elements of the latter group are identified by the following engineering data:

| | |
|---|---|
| Thyratron 13 | type FG 57 |
| Diodes 30 | type 6 H 6 |
| Winding 16a | 250 volts |
| Winding 16b | 6.3 volts |
| Transformer 28 | 5/2×50 volts |
| Capacitor 34 | 15 microfarads |
| Capacitor 25 | .001 microfarads |
| Resistor 36 | 10 ohms |
| Voltage divider 15 | 4500 ohms |
| Resistors 23, 32 | 10 kilo-ohms |
| Resistors 24, 35 | 100 kilo-ohms |

In operation, as long as switch 8 remains open grid 13b remains energized at a negative potential impressed thereon from tap 15a through resistors 23 and 24, thereby causing thyratron 13 to remain nonconductive. Switch 8 is so adjusted that contacts 8b close before the main contacts or, at the latest, simultaneously with the main contacts to connect capacitor 34 between tap 15b and terminal 15c. To render the description clearer however, the system will next be considered in the condition reached thereby a substantial length of time after closure of switch 8, at which time capacitor 34 has become fully charged at the voltage impressed thereon from voltage divider 15, and the inrush current through winding 6 has died down.

The flow of current through winding 6 causes a corresponding flow of current to take place through current transformers 26 and resistors 27. A portion of the current of resistors 27 is diverted to supply transformers 28 to cause impression of a voltage proportional thereto on the circuit joining cathode 13c to grid 13b through voltage divider 15, tap 15b, resistor 32, windings 28b, diodes 30 and resistor 23. As long as the output voltage of transformers 28 and diodes 30 remains less than the voltage appearing between taps 15a and 15b, diodes 30 remain nonconductive. When the latter condition no longer obtains diodes 30 become conductive and impress on grid 13b a potential above the potential of tap 15a.

When the flow of current through any of the conductors of circuit 7 reaches a predetermined value depending on the adjustment of resistors 27 and of tap 15b, grid 13b reaches the critical potential thereof and causes thyratron 13 to become conductive. Trip coil 8a is thereby operatively connected with battery 9 to cause opening of switch 8. The flow of current through winding 6 is interrupted, with the result that grid 13b is returned to the potential of tap 15a. Switch 8 also opens contacts 8c, thereby interrupting the flow of current through thyratron 13 and enabling grid 13b to maintain the thyratron nonconductive upon reclosure of the switch. Contacts 8b are also opened to enable capacitor 34 to discharge through resistors 32, 35.

When switch 8 closes the main contacts thereof, winding 6 generally receives from circuit 7 an inrush current having an exponential rate of decay. The initial magnitude of the inrush current is variable but has a definite maximum value, and the system is adjusted on the assumption that the inrush current may reach its maximum initial value in every instance. At the moment of closure of the main contacts of switch 8, or at a time immediately previously thereto, contacts 8b close to connect capacitor 34 and resistor 32 in series between tap 15b and terminal 15c, thereby momentarily depressing the potential of taps 28c to that of terminal 15c. Capacitor 34 is gradually charged from voltage divider 15 through resistor 32, and the voltage across the capacitor terminals increases exponentially to finally become equal to the voltage appearing between tap 15b and terminal 15c. The grid control circuit of thyratron 13 is thus impressed with a transient unidirectional voltage which gradually raises the potential of taps 28c from the potential of terminal 15c to that of tap 15b and impresses on grid 13b a transient negative potential component having an exponential rate of decay.

Thyratron 13 becomes conductive if the flow of current through winding 6 is of such intensity that windings 28b and diodes 30 impress on grid 13b a potential component overcoming the constant and transient negative potential components thereof. Tap 15b is preferably so adjusted that the voltage between tap 15b and terminal 15c is equal to the peak output voltage of windings 28b and diodes 30 resulting from the maximum initial half cycle of inrush current through winding 6. Resistor 32 is preferably so adjusted that the voltage between the taps 28c and tap 15b decays at the same rate as the output voltage of windings 28b and diodes 30 responsive to the inrush current. The flow of maximum inrush current through winding 6 is then entirely without effect on the potential of grid 13b while the flow of other current through winding 6 affects the potential of grid 13b during the flow of inrush current in the same manner as after the inrush current has died down. If the inrush current fails to reach the maximum initial value thereof, the effect of the actual inrush current is overcompensated and the sensitiveness of the system to abnormal currents during the flow of inrush current is somewhat decreased. In any event, the system remains uninterruptedly operative, both during the flow of inrush current and after the same has completely died down, to cause opening of switch 8 in response to the flow through winding 6 of current above a value proportional to the sum of a constant value and of the instantaneous value of the transient voltage impressed on the grid control circuit of thyratron 13.

The operativeness of diodes 30 and thyratron 13 may be checked by means of switches 29, when one of switches 29 is reversed from the position shown a potential is impressed from voltage divider 36 on grid 13b through the corresponding winding 28b and diode 30. The tap of voltage divider 36 is so adjusted that the voltage obtained therefrom is of sufficient value to cause thyratron 13 to become conductive. The different diodes 30 may thus be checked one at a time, thereby also checking the operativeness of thyratron 13. If it is desired to avoid energization of trip coil 8a in response to checking of the diodes and of the thyratron, switch 12 may be reversed to connect battery 9 with thyratron 13 through lamp 37. Lighting of lamp 37 then indicates operation of a diode 30 and of thyratron 13.

In the embodiment illustrated in Fig. 2 all discharge devices are of the cold cathode type which does not require the provision of a source of heating current for a cathode filament. Windings 28b are severally connected with the anodes of a plurality of rectifying devices 39 of the glow discharge type which require impression of a substantial voltage between anode and cathode to become conductive. The cathodes 39b of glow discharge tubes 39 are severally connected, through a plurality of resistors 40, with the control grid 41c of a grid glow or arc discharge tube 41 to render tube 41 conductive in response to the flow of current above a predetermined value through circuit 7. Grid 41c is also connected to the associated cathode 41d through a resistor 42.

Tube 41 serves to discharge a charged capacitor 43 through trip coil 8a to cause opening of switch 8. If a single tube and a single capacitor provide insufficient tripping current, additional tubes 44, 45 and associated capacitors 46, 47 may be provided to supply additional tripping current. The capacitors may be charged by means of any suitable source of direct current such as a rectifying device 48 associated with an autotransformer 49 energized from circuit 7. Resistors 51, 52 are connected between the anodes of tubes 41, 44 and 45 to cause each capacitor to discharge substantially only through the associated grid glow tube.

Control grid 44c is connected with cathode 41d through a resistor 53 and with anode 41a through a capacitor 54 to cause tube 44 to become conductive in response to discharge of capacitor 43 through tube 41. Grid 45c is likewise connected with cathode 44d through a resistor 55 and with anode 44a through a capacitor 56. Screen grids 41b, 44b, 45b may be maintained at suitable potentials by means of a pair of resistors 57, 58 connected across tube 41. In the present embodiment taps 28c are connected to ground through capacitor 34 and are connected to one of contacts 8b through resistor 32. The source of potential for charging capacitor 34 may be a much larger capacitor 59 connected across tube 41 through a voltage divider comprising a pair of resistors 61, 62. Satisfactory operation of the system may be obtained when the essential elements thereof are identified by the following engineering data:

| | |
|---|---|
| Tubes 39 | Type OZ4 |
| Tubes 41, 44, 45 | Type 631-P1 |
| Transformer 49 | 230 volts between terminals |
| Transformer 28 | 2.5/2 × 250 volts |
| Capacitors 54, 56 | 0.01 microfarad |
| Capacitor 34 | 1 microfarad |
| Capacitors 59, 43 | 15 microfarads |
| Capacitors 46, 47 | 30 microfarads |
| Resistor 40 | 5 kilo-ohms |
| Resistor 52 | 10 kilo-ohms |
| Resistor 51 | 20 kilo-ohms |
| Resistor 58 | 100 kilo-ohms |
| Resistors 61, 62 | 500 kilo-ohms |
| Resistors 32, 57, 42, 53, 55 | 1 megohm |
| Resistor 35 | 10 megohms |

In operation, switch 8 being open, taps 28c and grid 41c are maintained at ground potential through resistors 35 and 42 respectively. Capacitors 43, 46 and 47 are charged to a predetermined voltage from transformer 49 and rectifier 48, and capacitor 59 is charged to a lower voltage depending on the adjustment of resistors 61, 62. When the switch has been closed for such a length of time that the inrush current of winding 6 has died down the full voltage of capacitor 59 is impressed between taps 28c and ground through resistor 32 and contacts 8.

When the flow of current through winding 6 reaches a predetermined value, which value depends on the adjustment of resistors 27 and on the voltage of capacitor 59, the voltage of at least one of windings 28b becomes sufficient to cause the associated tube 39 to conduct current. A voltage equal to the sum of the output voltage of winding 28b and of the voltage of capacitor 59, less the voltage drop in tube 39, is thereby impressed between grid 41c and cathode 41d to cause valve 41 to become conductive. Capacitor 43 accordingly discharges through trip coil 8a and tube 41.

The potential of anode 41a is thereby abruptly depressed and a corresponding transient potential is impressed on grid 44c. The voltage between grids 44b and 44c then becomes sufficient to cause tube 44 to become conductive and discharge capacitor 46 through trip coil 8a. Tube 45 is rendered conductive in a similar manner to discharge capacitor 47 through trip coil 8a. The trip coil withdraws the latch of switch 8 to cause the switch to open.

During the flow of inrush current through winding 6 following closure of switch 8, capacitor 34 is gradually charged as a result of the transfer thereto through resistor 32 and contacts 8b of some of the energy stored in capacitor 59. The voltage between taps 28c and ground thus rises exponentially from zero to the full value of the voltage of capacitor 59 and thereafter remains at such value. To render one of tubes 39 to become conductive the flow of current through winding 6 must reach a value proportional to the difference of a constant value depending on the adjustment of resistors 27 and on the breakdown voltage of tubes 39, and of the value of the transient or constant voltage then being impressed between taps 28c and ground. Resistors 27 and 32 are preferably so adjusted that the difference between the voltages of capacitors 34 and 59 is equal at every instant to the peak voltage of windings 28b which results from the flow of maximum inrush current through winding 6. The system is then entirely unresponsive to inrush current and has the same response to the flow of other current through winding 6 during the flow of maximum inrush current and after the inrush current has died down.

As shown in Fig. 3, contacts 8b may be omitted, capacitor 34 then being charged from the terminals of winding 6 through a transformer 63, a rectifier 64 which may be similar to tubes 39 and a pair of resistors 65, 66. A capacitor 67 may serve to render the output voltage of transformer 63 and tube 64 substantially uniform. A voltage regulating tube 68 may be connected across resistors 35 and 66 to cause the charging current of capacitor 34 to be independent of variations in the value of the voltage of circuit 7.

Tube 41 may be used for controlling the flow of current through an ignitron 69 connecting trip coil 8a with a capacitor 70 charged from transformer 49 and rectifier 48. Cathode 41d is accordingly connected with igniter 69b and anode 41a is connected with the positive terminal of a capacitor 71 charged from rectifier 48 through a voltage divider comprising a pair of resistors 72, 73. A capacitor 74 is preferably connected between anode 69a and cathode 69c through a resistor 75 to facilitate establishment of the discharge through ignitron 69. The elements of the system of Fig. 3 not utilized in or modified from the embodiment illustrated in Fig. 2 may be identified by the following engineering data:

Ignitron 69_____ type GL415
Tube 68_____ type VR-150
Transformer 49_____ 345 volts between terminals
Winding 63b_____ 2×300 volts
Capacitor 67_____ 0.1 microfarads
Capacitor 71_____ 2 microfarads
Capacitor 74_____ 5 microfarads
Capacitor 70_____ 50 microfarads
Resistor 75_____ 10 ohms
Resistor 65_____ 2 kilo-ohms
Resistor 72_____ 100 kilo-ohms
Resistor 73_____ 300 kilo-ohms
Resistors 66, 35____ 1 megohm In operation, when switch 8 is open capacitor 34 is uncharged. Upon closure of switch 8, capacitor 34 becomes charged to a voltage increasing exponentially to a final value and at a rate depending on the adjustment of the resistors 35 and 66. As in the embodiment illustrated in Fig. 2 the system is so adjusted that tubes 39 are unresponsive to inrush current and become conductive only in response to other currents above a predetermined value through winding 6. When tubes 39 and 41 are rendered conductive, capacitor 71 discharges through tube 41, igniter 69b and cathode 69c to cause ignitron 69 to become conductive. Capacitor 70 then discharges through trip coil 8a and ignitron 69. Because of the relatively high inductance of trip coil 8a, the current therethrough reaches its peak value a relatively long time after capacitor 71 has discharged through igniter 69b. During the initial period of the current flow through coil 8a ignitron 69 is maintained conductive by the discharge of capacitor 74 therethrough.

Although but a few embodiments of the present invention have been shown and described, it will be apparent to one skilled in the art that various changes and modifications may be made therein without departing from the spirit of the invention or the scope of the appended claims.

It is claimed and desired to secure by Letters Patent:

1. In a system for controlling the operation of switching means connecting an inductive device with a source of alternating current, the combination of means comprising an electric valve for causing disconnecting operation of said switching means, means for controlling the conductivity of said valve comprising an element of said valve and a control circuit comprising a resistor connected to said element, means comprising a capacitor, a source of direct current, and an element of said switching means for connecting said capacitor in series with said source of direct current across said resistor to impress on said circuit a transient unidirectional voltage having a predetermined initial value and an exponential rate of decay in response to connecting operation of said switching means, and means responsive to the flow of current through said inductive device for impressing a second unidirectional voltage on said circuit.

2. In a system for controlling the operation of switching means connecting an inductive device with a source of alternating current, the combination of means comprising an electric valve for causing disconnecting operation of said switching means, means for controlling the conductivity of said valve comprising two elements of said valve and a control circuit comprising a resistor connected between said elements, means comprising a source of direct current, a capacitor and contacts of said switching means for connecting said capacitor and said source of direct current in series across said resistor to impress a transient unidirectional voltage on said circuit in response to connecting operation of said switching means, means comprising a current transformer provided with a primary winding connected with said inductive device and with a secondary winding and rectifying means for impressing a second unidirectional voltage on said circuit, and means connecting said secondary winding and said rectifying means in series with said resistor in said circuit to render said valve conductive in response to the flow through said inductive device of current above a value depending on the instantaneous value of said transient voltage.

3. In a system for controlling the operation of switching means connecting an inductive device with a source of alternating current, the combination of means comprising an electric valve for causing disconnecting operation of said switching means, means for controlling the conductivity of said valve comprising an element of said valve and a control circuit comprising a resistor connected to said element, means comprising a source of direct current, a capacitor, and an element of said switching means for connecting said capacitor and said source of direct current in series across said resistor to impress on said circuit a unidirectional potential having a predetermined initial value and an exponential rate of decay, and means comprising a current transformer connected with said inductive device and rectifying means for impressing a second unidirectional voltage on said circuit to render said valve conductive in response to the flow through said inductive device of current above a value depending on the instantaneous value of said transient voltage.

4. In a system for controlling the operation of switching means connecting an inductive device with a source of alternating current, the combination of means comprising an electric valve for causing disconnecting operation of said switching means, means for controlling the conductivity of said valve comprising a control element of said valve and a control circuit connected to said element, means responsive to connecting operation of said switching means for impressing on said element a first positive voltage having a transient rise to a predetermined value, means comprising a current transformer provided with a primary winding connected with said inductive device and with a secondary winding and rectifying means for impressing a second positive voltage on said element, and means connecting said secondary winding and said rectifying means in series in said circuit to render said valve conductive in response to the flow through said inductive device of current above a value depending on the value of said first positive voltage.

5. In a system for controlling the operation of switching means connecting an inductive device with a source of alternating current, the combination of means comprising an electric valve for causing disconnecting operation of said switching means, means for controlling the conductivity of said valve comprising two elements of said valve, and a control circuit comprising a capacitor connected between said elements, means comprising a source of potential, a resistor, and an element of said switching means for connecting said resistor and said source across said capacitor for impressing on said circuit a first unidirectional voltage component rising exponentially to a predetermined value, means comprising a current transformer provided with a primary winding connected with said device and with a secondary winding and rectifying means for impressing on said circuit a second unidirectional voltage component, and means connecting said secondary winding, said rectifying means and said capacitor in series in said circuit to render said valve conductive in response to the flow through said device of current depending on the value of said first unidirectional voltage component.

6. In a system for controlling the operation of switching means connecting an inductive device in circuit with a source of alternating current, the combination of means comprising a first electric valve and a second electric valve for causing disconnecting operation of said switching means, a first capacitor connected in series with said first valve, a second capacitor connected in series with said second valve, means for charging said capacitors, control means responsive to an operating condition of said circuit for rendering said first valve conductive to discharge said first capacitor, and means responsive to discharge of said first capacitor for rendering said second valve conductive to discharge said second capacitor.

7. In a system for controlling the operation of a switching means connecting an inductive device in circuit with a source of alternating current, the combination of means comprising a first electric valve and a second electric valve for causing disconnecting operation of said switching means, a first capacitor connected in series with said first valve, a second capacitor connected in series with said second valve, means for charging said capacitors, control means responsive to an operating condition of said circuit for rendering said first valve conductive to discharge said first capacitor for rendering said second valve conductive to discharge said second capacitor, and means responsive to connecting operation of said switching means for gradually varying the response of said control means.

8. In a system for controlling the operation of a switching means connecting an inductive device in circuit with a source of alternating current, the combination of means comprising a first electric valve and a first capacitor connected in series, a second electric valve and a second capacitor for causing disconnecting operation of said switching means, said first valve comprising an element for controlling the conductivity thereof, said second valve connecting said second capacitor with said element, means for charging said capacitors, and control means responsive to an operating condition of said circuit for rendering said second valve conductive to discharge said second capacitor through said element to thereby render said first valve conductive to discharge said first capacitor.

9. In a system for controlling the operation of a switching means connecting an inductive device in circuit with a source of alternating current, the combination of means comprising a first electric valve and a second electric valve for causing disconnecting operation of said switching means, a first capacitor connected in series with said first valve, said first valve comprising an element for controlling the conductivity thereof, a second capacitor, said second valve connecting said second capacitor with said element, means for charging said capacitors, and control means responsive to an operating condition of said circuit for rendering said second valve conductive to discharge said second capacitor through said element to thereby render said first valve conductive to discharge said first capacitor, and means responsive to connecting operation of said switching means for gradually varying the responsiveness of said control means.

10. In a system for controlling the operation of switching means connecting an inductive device with a source of alternating current, the combination of means comprising an electric valve for causing disconnecting operation of said switching means, means for controlling the conductivity of said valve comprising two electrodes of said valve and a control circuit connected between said electrodes, a source of potential, a capacitor element, a resistor element, one of said elements being connected in said circuit, means comprising contacts of said switching means for connecting the other of said elements and said source of potential in series across said one of said elements for impressing on said circuit a transient unidirectional voltage component, means comprising a current transformer provided with a primary winding connected with said device and with a secondary winding, rectifying means, and means connecting said secondary winding, said rectifying means and said one of said elements in series between said electrodes in said circuit to impress on said circuit a second unidirectional voltage component rendering said valve conductive in response to the flow through said device of current proportional to a resultant of a constant value and the value of said first unidirectional voltage component.

11. In a system for controlling the operation of switching means connecting an inductive device in circuit with a source of alternating current, the combination comprising tripping means for causing disconnecting operation of said switching means, first and second electric valves, a first capacitor connected in series with said first valve, a second capacitor connected in series with said second valve and said tripping means, means for charging said capacitors, means for controlling the conductivity of said first valve comprising a control element of said first valve and a control circuit connected to said element, means in said control circuit responsive to connecting operation of said switching means for impressing on said element a first positive voltage having a transient rise to a predetermined value, a current transformer provided with a primary winding connected with said inductive device and with a secondary winding, rectifying means, means connecting said secondary winding and said rectifying means in series in said control circuit for impressing a second positive voltage on said element to render said first valve conductive to discharge said first capacitor in response to the flow through said inductive device of current above a value depending on the value of said first positive voltage, and means responsive to discharge of said first capacitor for rendering said second valve conductive to discharge said second capacitor through said tripping means for causing disconnecting operation of said switching means.

12. In a system for controlling the operation of switching means connecting an inductive device in circuit with a source of alternating current, the combination comprising tripping means for causing disconnecting operation of said switching means, first and second electric valves, a first capacitor connected in series with said first electric valve, a second capacitor connected in series with said second electric valve and said tripping means, means for charging said capacitors, means for controlling the conductivity of said first valve comprising two elements of said first valve and a control circuit comprising a third capacitor connected between said elements, means comprising a source of potential, a resistor, and an element of said switching means for connecting said resistor and said source of potential across said third capacitor for impressing on said control circuit a first unidirectional voltage component rising exponentially to a predetermined value, means comprising a current transformer provided with a primary winding connected with said device and with a secondary winding and rectifying means for impressing on said control circuit a second unidirectional voltage component, means connecting said secondary winding, said rectifying means and said third capacitor in series in said control circuit to render said first valve conductive to discharge said first capacitor in response to the flow through said device of current above a value depending on the value of said first unidirectional voltage component, and means responsive to discharge of said first capacitor for rendering said second valve conductive to discharge said second capacitor through said tripping means to cause disconnecting operation of said switching means.

13. In a system for controlling the operation of switching means connecting an inductive device with a source of alternating current, the combination of means comprising an electric valve for causing disconnecting operation of said switching means, means for controlling the conductivity of said valve comprising an element of said valve, means comprising a source of potential for impressing a substantially constant negative potential on said element of said valve to maintain said valve non-conductive, a resistor connecting said source of potential to said element of said valve, an element of said switching means, a capacitor, said element of said switching means connecting said capacitor between said source of potential and said element of said valve for impressing on said element of said valve a constant negative potential component superposed on a transient negative potential component having an exponential rate of decay, and means comprising a current transformer connected with said inductive device and rectifying means for overcoming said potential components to render said valve conductive in response to the flow of current above a value proportional to the sum of a constant value and of the instaneous value of said transient potential component.

KARL LERSTRUP.

REFERENCES CITED

The following references are of record in the file of this patent:

UNITED STATES PATENTS

| Number | Name | Date |
|---|---|---|
| 1,927,794 | Fallou | Sept. 19, 1933 |
| 1,960,083 | Cruise et al. | May 22, 1934 |
| 2,027,226 | Goldsborough | Jan. 7, 1936 |
| 2,053,445 | Rose | Sept. 8, 1936 |
| 2,147,781 | Ward | Feb. 21, 1939 |
| 2,246,816 | Sandstrom | June 24, 1941 |
| 2,280,898 | Dyer et al. | Apr. 28, 1942 |
| 2,319,215 | Dawson | May 18, 1943 |
| 2,347,714 | Sorensen | May 2, 1944 |
| 2,366,060 | Schneider | Dec. 26, 1944 |
| 2,376,808 | Ratz | May 22, 1945 |
| 2,427,750 | Snyder | Sept. 23, 1947 |

FOREIGN PATENTS

| Number | Country | Date |
|---|---|---|
| 176,134 | Great Britain | Mar. 1, 1922 |

OTHER REFERENCES

Article: "Capacity-Stored Energy for Circuit Breaker Tripping"; Electrical Journal, pages 193 and 194, May 1937.